(12) United States Patent
Ritter et al.

(10) Patent No.: US 6,242,050 B1
(45) Date of Patent: *Jun. 5, 2001

(54) METHOD FOR PRODUCING A ROUGHENED BOND COAT USING A SLURRY

(75) Inventors: Ann Melinda Ritter; Melvin Robert Jackson, both of Niskayuna; Curtis Alan Johnson, Schenectady, all of NY (US)

(73) Assignee: General Electric Company, Schenectady, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,062

(22) Filed: Nov. 24, 1998

(51) Int. Cl.[7] ..................................................... C23C 4/18
(52) U.S. Cl. .................. 427/454; 427/456; 427/376.6; 427/383.7
(58) Field of Search ................................. 427/454, 456, 427/376.6, 383.7

(56) References Cited

U.S. PATENT DOCUMENTS

| 3,961,098 | * | 6/1976 | Bessen ................................. 427/191 |
| 5,236,745 | * | 8/1993 | Gupta et al. ........................ 427/454 |
| 5,403,669 |   | 4/1995 | Gupta et al. ........................ 428/550 |

* cited by examiner

*Primary Examiner*—Katherine A. Bareford
(74) *Attorney, Agent, or Firm*—Robert P. Santandrea; Noreen C. Johnson

(57) ABSTRACT

A method of providing a roughened bond coat, for example in a thermal barrier coating system, comprises providing an oxidation-resistant plasma-sprayed layer onto a substrate and disposing a slurry overlayer on the oxidation-resistant plasma-sprayed layer. These steps form a roughened bond coat possessing an uneven, undulated, and irregular surface. A roughened bond coat in a thermal barrier coating system reduces de-bonding of the bond coat and a thermal barrier coating layer, which is desirable to maintain the insulation features of the thermal barrier coating system.

32 Claims, 3 Drawing Sheets

METHOD FOR PRODUCING A ROUGHENED BOND COAT USING A SLURRY

BACKGROUND OF THE INVENTION

The invention relates to bond coats. In particular, the invention relates to roughened bond coats for thermal barrier coating systems.

Thermal barrier coating systems are used in hot-section components in turbine and turbine components, for example components of jet engines and gas turbines. The thermal barrier coating system insulates the turbines from high temperatures during thermal cycling. Thermal barrier coating systems include a thermal barrier coating (TBC) disposed on a bond coat, which in turn is disposed on a substrate. The thermal barrier coating normally comprises zirconia, for example such as one of a stabilized zirconia and a partially-stabilized zirconia (PSZ). The bond coat typically comprises an oxidation-resistant metallic layer disposed between the TBC and substrate (turbine component). The TBC is adhered to the bond coat typically by mechanical interlocking, so the bond coat provides oxidation resistance to the substrate and a relatively rough surface. The bond coat surface generally has Ra (Arithmetic Average Roughness (Ra) as determined from ANSI/ASME Standard B461-1985) values over about 350 mainly by mechanical interlocking. So the function of the bond coat is to provide oxidation resistance to the substrate and a relatively rough surface, preferably with Ra values over about 350 microinches, for the TBC to adhere to the substrate. Thus, the TBC is disposed over the turbine component and can provide thermal insulation.

FIG. 1 is a schematic representation of a known thermal barrier coating system 1. A substrate 10 comprises an underlying part of a component, for example a turbine component. A bond coat 12 is disposed on the substrate 10. The bond coat is disposed on the substrate 10 by any appropriate method, for example, but not limited to, thermal spray processes, such as vacuum plasma spray (VPS), air plasma spray (APS) and hyper-velocity oxy-fuel (HVOF) spray processes.

The structure and roughness of bond coat surface 13 are dependent on the spray process. Bond coats deposited by a VPS process are typically dense and free of oxides. Therefore, VPS-applied bond coats provide protection at high temperatures against oxidation. The VPS application process disposes fine powders, and thus, VPS-applied bond coats are typically dense, for example having a density greater than about 90% of its theoretical density, but have relatively smooth surfaces. Consequently, a TBC does not adhere well to a VPS bond coat.

An air plasma spray (APS) process produces rough bond coats because of large powders used in APS. The large powders possess a relatively high heat capacity; however, the APS-applied bond coats contain high amounts of oxides. Also, APS-applied bond coats possess a relatively low porosity due to the oxidation environment and low momentum of the powders. Although APS-applied bond coats provide better TBC adhesion due to their roughness, they are more prone to oxidation because of their relatively high oxide levels and relatively low porosity.

Bond coats deposited by HVOF are sensitive to particle size distributions. Dense and oxide-free bond coats can be deposited by HVOF using very lean conditions (low oxygen amounts) and finer particles, for example particles with a size about −325+10 μm. The surface roughness of HVOF-applied bond coats is relatively smooth. Rough bond coats can be deposited by HVOF using coarser powders, for example particles with a size about −230+325, however a low HVOF flame temperature is needed. The low flame temperatures result in the bond coat comprising un-melted powders, therefore the coating is porous and less dense.

A TBC 14 is disposed on the bond coat 12 and forms a surface 15 against the surface 13. The TBC 14 is disposed on the bond coat 12 by any appropriate process to adhere (bond) to the bond coat. The TBC surface 15 and bond coat surface 13 define an interfacial area 16 at their adjoining surfaces.

Effectiveness of a thermal barrier coating system during thermal cycling is compromised by de-bonding of the TBC and bond coat, for example at the TBC and bond coat interfacial area. De-bonding can be caused by at least one of a poor TBC and bond coat adhesion, and lack of accommodation of thermal expansion mismatch between the TBC and bond coat. The lack of adhesion is characteristic of smooth adjoining surfaces where a total surface area is minimal. The thermal expansion mismatch between the TBC and bond coat results from different coefficients of thermal expansion of the materials used for these features. If the difference in coefficients of thermal expansion of the adhered elements is large, one element expands much more than the other, and separation and de-bonding occur at the interfacial areas. De-bonding of the TBC and bond coat is undesirable as the insulation effect of the thermal barrier coating system will be lost at TBC separation.

Therefore, it is desirable to use a very dense and rough bond coat that provides oxidation resistance and promotes enhanced adhesion between the TBC and the bond coat. The adhesion between the TBC and bond coat can be increased by increasing an area at an interfacial area mating surface of adhered elements. Increasing a roughness of the bond coat provides an increased area and enhanced mechanical interlocking between the bond coat and TBC. Increasing a bond coat's roughness also provides an increased interfacial surface area for accommodation of any thermal mismatch, with respect to non-roughened bond coats.

SUMMARY OF THE INVENTION

Thus, this invention overcomes the above noted deficiencies of known bond coats and thermal barrier coating systems. The invention provides a method for providing a dense (for example at least about 95% its theoretical density), roughened bond coat, for example on a substrate, such as a turbine component, in a thermal barrier coating system. The method comprises providing an oxidation-resistant plasma-sprayed layer onto a substrate; and disposing a slurry overlayer on the oxidation-resistant plasma-sprayed layer to form a roughened bond coat possessing an uneven, undulated, and irregular surface.

A dense, (for example at least about 95% its theoretical density), roughened bond coat is also set forth in an embodiment of the invention. The roughened bond coat comprises an oxidation-resistant plasma-sprayed layer and a slurry overlayer on the oxidation-resistant plasma-sprayed layer to form an uneven, undulated, and irregular surface.

Further, a method for providing a thermal barrier coating system is disclosed in another embodiment of the invention. The thermal barrier coating system comprises a dense (for example at least about 95% its theoretical density), roughened bond coat and a thermal barrier coating disposed on a substrate. The method of providing a thermal barrier coating system comprises disposing a roughened bond coat on the substrate and disposing a thermal barrier coating on the roughened bond coat. The disposing a roughened bond coat comprises providing an oxidation-resistant plasma-sprayed layer onto a substrate and disposing a slurry overlayer on the oxidation-resistant plasma-sprayed layer to form an uneven, undulated, and irregular surface.

A thermal barrier coating system, as embodied by the invention, comprises a dense (for example at least about 95% its theoretical density), roughened bond coat disposed on a substrate and a thermal barrier coating disposed on the roughened bond coat. The roughened bond coat comprises an oxidation-resistant plasma-sprayed layer and a slurry overlayer on the oxidation-resistant plasma-sprayed layer. These layers form the roughened bond coat possessing an uneven, undulated, and irregular surface.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

Roughened bond coats enhance adhesion between a thermal barrier coating (TBC) and a bond coat in a thermal barrier coating system. Roughened bond coats prevent de-bonding and separation between the TBC and bond coat of the thermal barrier coating system. A roughened bond coat increases interfacial mating surface areas of adhered elements, enhances mechanical interlocking between the bond coat and TBC, and provides for accommodation of any thermal mismatch between the TBC and bond coat. Accordingly, expansion of elements in a thermal barrier coating system with a roughened bond coat does not lend to separation and de-bonding therebetween. An effect of the roughened bond coat includes an enhanced life of the TBC in the thermal barrier coating system.

In the following description, material compositions of mixtures are provided in weight percent unless otherwise expressed. Further, individual compositions are provided in weight percent, unless otherwise provided. For example, if a mixture comprises about 70% of Constituent A and about 30% of constituent B, the percents are in approximate weight percents. Nomenclature used for compositions is as follows. If Composition A comprises Ni-23Cr-6Al-0.4Y, yttrium is provided at 0.4 weight percent, aluminum is provided at 6 weight percent, chromium is provided at 23 weight percent, and nickel is provided as the balance weight percent.

Figure 1:
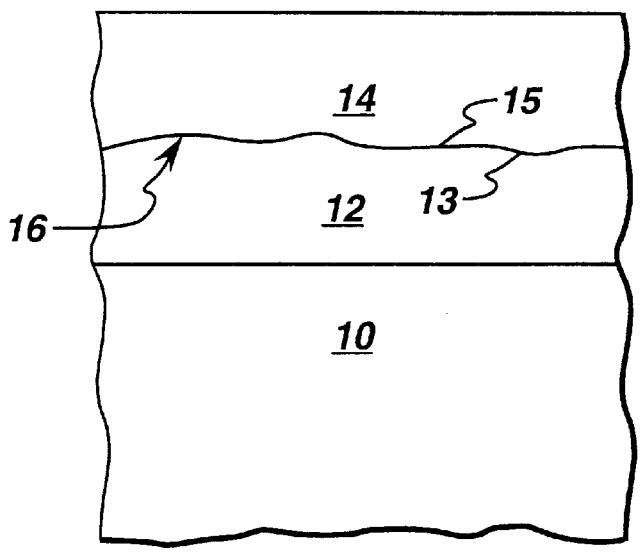
FIG. 1 is a schematic representation of a known thermal barrier coating system.
Figure 2:
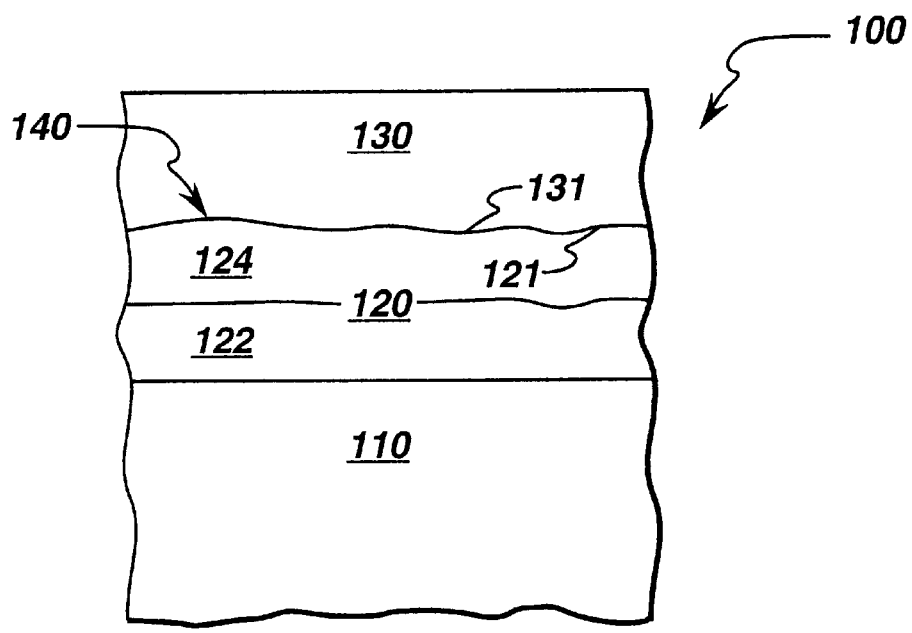
FIG. 2 is a schematic representation of a thermal barrier coating system including a roughened bond coat.

FIG. 2 is a schematic illustration of a thermal barrier coating system 100, as embodied by the invention. The thermal barrier coating system 100 comprises a substrate 110. A dense roughened bond coat 120, which possesses an uneven, undulated, and irregular surface, is disposed on the substrate 110. A thermal barrier coating (TBC) 130 is disposed on the roughened bond coat 120. The roughened bond coat 120 comprises an uneven, undulated, and irregular surface 121, which is disposed against a mating surface 131 of the TBC 130 to define a roughened interfacial surface area 140. The density of the bond coat 120 is at least about 95% its theoretical density.

The substrate 110 comprises an element to be thermally insulated by the thermal barrier coating system 100. For example, the substrate 110 comprises a component such as a turbine component, turbine airfoil blade, bucket, vane, and nozzle (hereinafter "turbine component"). If the substrate 110 comprises a turbine component, an appropriate substrate material includes one of a nickel-based superalloy material, an iron-based superalloy material, a nickel-iron-based superalloy material, and a cobalt-based superalloy material. The following description refers to a nickel-based superalloy material, however this material is merely exemplary of substrate materials, and is not meant to limit the invention in any way. Other substrate materials are within the scope of the invention.

The TBC 130 comprises appropriate materials that provide thermal insulation. For example, but in no way limiting of the invention, the TBC 130 comprises zirconia. The zirconia comprises at least one of a stabilized zirconia and a partially stabilized zirconia (PSZ).

The roughened interfacial surface area 140, which is defined by the surfaces 121 and 131, has a larger interfacial surface area, with respect to a substantially smooth interfacial area 16 of a known thermal barrier coating system 1. The roughened interfacial surface area 140 permits more contact between the roughened bond coat 120 and the TBC 130. This contact provides enhanced mechanical interlocking and adhesion between the bond coat 120 and TBC 130.

The roughened bond coat 120 comprises an oxidation-resistant plasma-sprayed layer 122 and a slurry overlayer 124. The oxidation-resistant plasma-sprayed layer 122 is applied to the substrate 110 by an appropriate process, such as by an air plasma-spraying process.

The oxidation-resistant plasma-sprayed layer 122 comprises an oxidation resistant material. An exemplary oxidation resistant material comprises MCrAlY, where M is at least one of nickel (Ni), iron (Fe), and cobalt (Co), for example Ni-23Cr-6Al-0.4Y (weight percent). The oxidation-resistant plasma-sprayed layer 122 is applied with a thickness in a range from about 0.005 inches to about 0.010 inches (about 0.0125 cm to about 0.025 cm). The invention describes MCrAlY as NiCrAlY, however this is merely exemplary and not meant to limit the invention in any way.

The roughness of the bond coat 120 is sufficient to increase interfacial surface areas at the interface, thus reducing de-bonding and increasing accommodation of thermal expansion mismatches. The bond coat 120, as embodied by the invention, possesses a roughness in a range of about 100 microinches (about $2.5 \times 10^{-4}$ cm) Ra (Arithmetic Average Roughness (Ra) as determined from ANSI/ASME Standard B461-1985) to about 2000 microinches (about $5.0 \times 10^{-3}$ cm) Ra. Alternatively, the bond coat 120 possesses a roughness in a range of about 100 microinches (about $2.5 \times 10^{-4}$ cm) Ra to about 400 microinches (about $1.0 \times 10^{-3}$ cm) Ra. Further, the bond coat 120 possesses a roughness in a range of about 100 microinches (about $2.5 \times 10^{-4}$ cm) Ra to about 300 microinches (about $7.5 \times 10^{-4}$ cm) Ra.

The slurry overlayer 124 is formed from a slurry mixture. The slurry mixture comprises at least a first oxidation-resistant powder with a first melting point, a second oxidation-resistant powder with a second melting point that is lower than the first melting point, and an appropriate binder that holds powders and similar materials together. The slurry overlayer 124 is disposed on the oxidation-resistant plasma-sprayed layer 122. For example, the slurry overlayer 124 is coated onto the oxidation-resistant plasma-sprayed layer 122, such as by a painting process. The combination of first and second melting point powders results in a higher density, for example a density of at least about 95% of its theoretical density.

Compositions for the slurry overlayer 124 comprise a binder and a metal powder, where the metal powder comprises various constituents in various amounts. A first slurry composition, "Slurry A" comprises a mixture of about 70% metal powder by weight and about 30% binder by weight. The Slurry A metal powder comprises about 50 volume-percent NiCrAlY (Ni-23Cr-6Al-0.4Y) and about 50 volume-percent Al-11.6Si (weight percent).

A second slurry composition, "Slurry B," also comprises a mixture of about 70% metal powder by weight and about 30% binder by weight. The Slurry B metal powder comprises about 50 volume-percent NiCrAlY and about 50 volume-percent Ni-60Al-1B (weight-percent).

NiCrAlY is an oxidation-resistant material with a relatively high melting point (about 1350° C.). Al-11.6Si and Ni-60Al-1B have melting points, about 577° C. and about 850° C., respectively, which are lower than that of NiCrAlY. Therefore, Al-11.6Si and Ni-60Al-1B melt before NiCrAlY during any subsequent heat treatments of the thermal barrier coating system 100. When the Al-11.6Si and Ni-60Al-1B reacts with the NiCrAlY in the slurry and the material of the oxidation-resistant layer 122 re-solidify, they fuse (bond) the NiCrAlY and layer 122 together. The TBC, for example, but not limited to, a ceramic composition TBC, is then applied to the surface 121 by an appropriate process, such as, but not limited to, air plasma spraying (APS)

Figure 3:
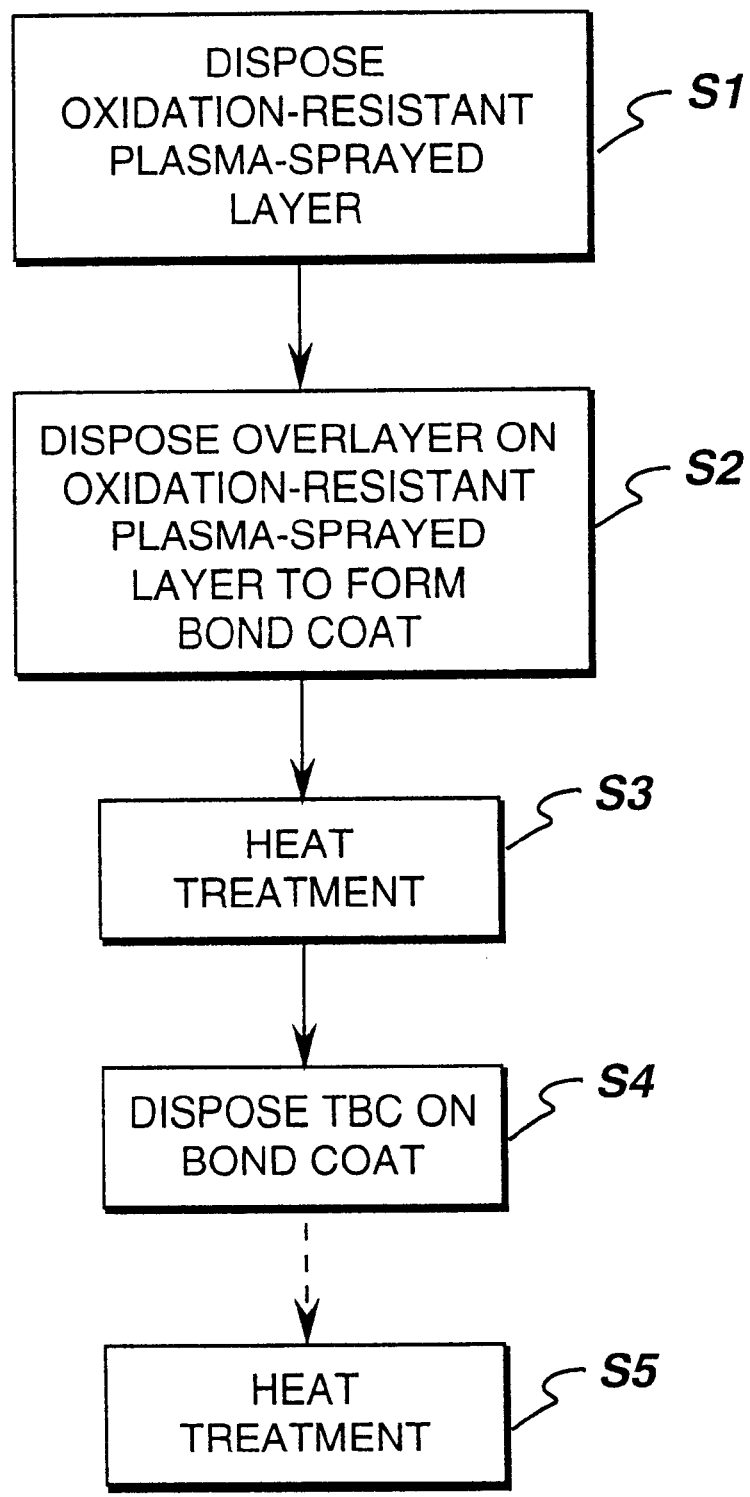
FIG. 3 is a flow chart of one method for forming a thermal barrier coating system.

FIG. 3 is a flow chart of a process to prepare a thermal barrier coating system that includes a roughened bond coat, as embodied by the invention. In step S1, the oxidation-resistant plasma-sprayed layer is disposed onto a substrate, for example a turbine component. In step S2, the slurry overlayer is disposed on the oxidation-resistant plasma-sprayed layer. The disposing of the oxidation-resistant plasma-sprayed layer and slurry overlayer form a bond coat, when they are re-acted and fused in a heat treatment of step S3. For example, an exemplary heat treatment comprises heating at about 1200° C. for about 1 hr in a vacuum.

In step S4, a TBC is disposed onto the bond coat to form a thermal barrier coating system. The thermal barrier coating system undergoes optional heat treatment in step S5. Any optional heat treatments of the thermal barrier coating system occur after the TBC has dried.

Re-solidification after heat treatment causes the melted low melting point powder, such as at least one of melted Al-11.6Si and Ni-60Al-1B, to fuse un-melted high melting point powders, for example NiCrAlY powder, to the plasma-sprayed layer. The fusing results in an enhanced roughened bond coat since some un-melted powders tend to be located at the surface of the material as it re-solidifies. The fusing also results in enhanced adhesion of the thermal barrier coating system's features because of the enhances interfacial area.

Figure 4:
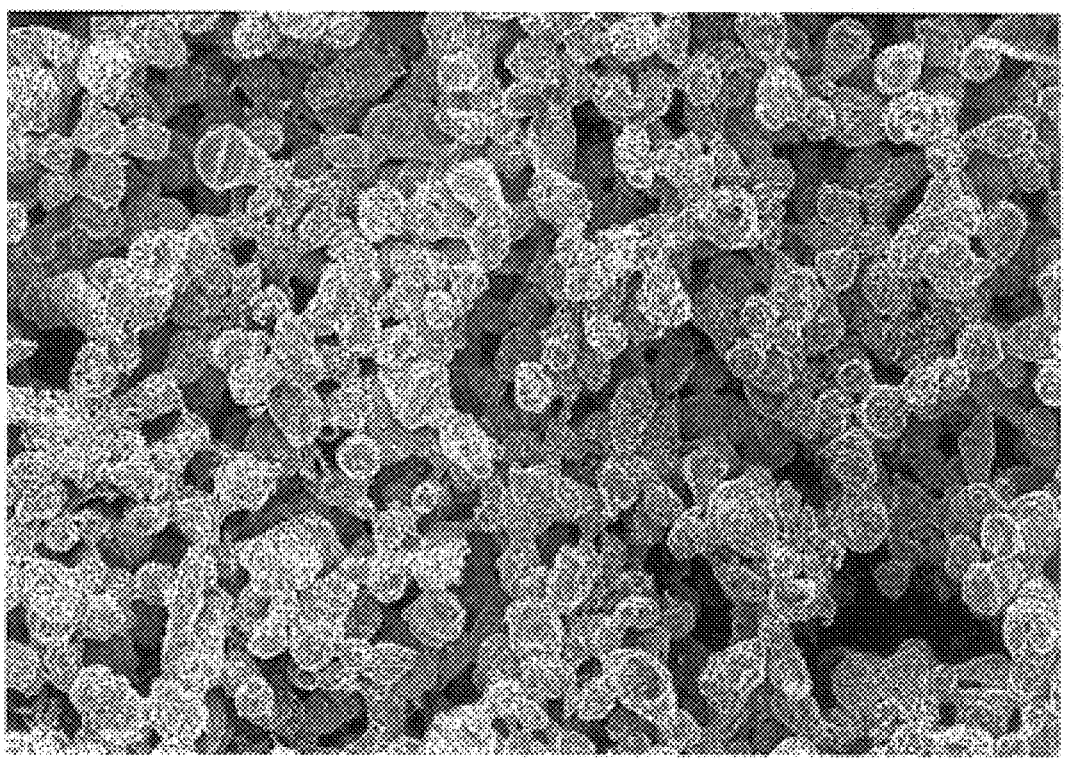
FIG. 4 is a microphotograph of a roughened bond coat.

FIG. 4 is as microphotograph of a roughened bond coat, as embodied by the invention. As illustrated, a surface of the bond coat is rough and possesses an uneven, undulated, and irregular surface. A high melting point powder, such as NiCrAlY powder, in the slurry-formed overlayer does not melt during heat treatment, since its melting point is higher than that of the heat treatment. If the heat treatment temperature is above that of the low melting point powder, such as Al-11.6Si and Ni-60Al-1B, these powders are melted, re-acted, and re-solidified.

While various embodiments are described herein, it will be appreciated from the specification that various combinations of elements, variations or improvements therein may be made by those skilled in the art, and are within the scope of the invention.

What is claimed is:

1. A method of providing a bond coat, the method comprising:
    a) disposing an oxidation-resistant, plasma-sprayed layer on a substrate;
    b) disposing a slurry mixture as an overlayer on the oxidation-resistant, plasma-sprayed layer to form a discrete outer layer having an outer surface, wherein the outer surface has an enhanced degree of roughness; and
    c) fusing the overlayer to the oxidation-resistant, plasma-sprayed layer by heat treating the oxidation-resistant plasma-sprayed layer, the overlayer, and the substrate, thereby forming the bond coat on the substrate.

2. A method according to claim 1, wherein the step of disposing an oxidation-resistant plasma-sprayed layer comprises air-plasma spraying.

3. A method according to claim 1, wherein the step of disposing an oxidation-resistant plasma-sprayed layer comprises plasma spraying an oxidation-resistant material.

4. A method according to claim 3, wherein the oxidation resistant material comprises MCrAlY, where M is at least one of nickel (Ni), iron (Fe), and cobalt (Co).

5. A method according to claim 4, wherein the MCrAlY comprises Ni-23Cr-6Al-0.4Y.

6. A method according to claim 5, wherein said plasma spraying comprises providing a layer with a thickness in a range from about 0.0125 cm to about 0.025 cm.

7. A method according to claim 1, wherein the step of disposing a slurry mixture comprises providing a metal powder mixture and a binder.

8. A method according to claim 7, wherein the step of providing a metal powder mixture and a binder comprises providing about 70% by weight of metal powder and about 30% by weight of a binder.

9. A method according to claim 7, wherein the step of providing a metal powder mixture comprises providing a first oxidation-resistant powder having a first melting point and a second oxidation resistant powder having a second melting point that is lower than the first melting point.

10. A method according to claim 9, wherein the step of providing the first oxidation-resistant powder and the second oxidation resistant powder comprises providing about 50% by volume of the first oxidation-resistant powder and about 50% by volume of the second oxidation-resistant powder.

11. A method according to claim 9, wherein the second oxidation resistant powder mixture comprises at least one of Al-11.6Si and Ni-60Al-1B.

12. A method according to claims 7, wherein the metal powder mixture comprises MCrAlY, where M is at least one of nickel (Ni), iron (Fe), and cobalt (Co).

13. A method according to claim 1, further comprising disposing the bond coat on a turbine component.

14. A method according to claim 1, wherein the disposing of the overlayer forms the uneven, undulated, and irregular surface with roughness in a range from about $2.5 \times 10^{-4}$ cm Ra to about $5.0 \times 10^{-3}$ cm Ra.

15. A method according to claim 1, wherein the disposing of the overlayer forms the uneven, undulated, and irregular surface with roughness in a range from about $2.5 \times 10^{-4}$ cm Ra to about $10 \times 10^{-3}$ cm Ra.

16. A method according to claim 1, wherein the disposing of the overlayer forms the uneven, undulated, and irregular surface with roughness in a range from about $2.5 \times 10^{-4}$ cm Ra to about $7.5 \times 10^{-4}$ cm Ra.

17. A method of providing a thermal barrier coating system which comprises a roughened bond coat and a thermal barrier coating disposed on a substrate, said method comprising:

a) disposing an oxidation-resistant, plasma-sprayed layer on a substrate;
   b) disposing a slurry mixture as an overlayer on the oxidation-resistant, plasma-sprayed layer to form an outer surface, wherein the outer surface has an enhanced degree of roughness;
   c) fusing the overlayer to the oxidation-resistant, plasma-sprayed layer by heat treating the oxidation-resistant, plasma-sprayed layer, the overlayer, and the substrate, thereby forming the bond coat on the substrate; and
   d) disposing a thermal barrier coating on the bond coat.

18. A method according to claim 17, wherein the step of disposing an oxidation-resistant plasma-sprayed layer comprises air-plasma spraying.

19. A method according to claim 17, wherein the step of disposing an oxidation-resistant plasma-sprayed layer comprises plasma spraying an oxidation-resistant material.

20. A method according to claim 19, wherein the oxidation resistant material comprises MCrAlY, where M is at least one of nickel (Ni), iron (Fe), and cobalt (Co).

21. A method according to claim 20, wherein the MCrAlY comprises Ni-23Cr-6Al-0.4Y.

22. A method according to claim 19, wherein said plasma spraying comprises providing a layer with a thickness in a range from about 0.0125 cm to about 0.025 cm.

23. A method according to claim 17, wherein the step of providing a slurry mixture comprises providing a metal powder mixture and a binder.

24. A method according to claim 23, wherein the step of providing a metal powder mixture and a binder comprises providing about 70% by weight of metal powder and about 30% by weight of a binder.

25. A method according to claim 23, wherein the step of providing a metal powder mixture comprises providing a first oxidation-resistant powder having a first melting point and a second oxidation resistant powder having a second melting point that is lower than the first melting point.

26. A method according to claim 25, wherein the step of providing the first oxidation-resistant powder metal powder and the second oxidation resistant powder comprises providing about 50% by volume of the first oxidation-resistant powder and about 50% by volume of the second oxidation-resistant powder.

27. Add A method according to claim 25, wherein the first oxidation resistant powder comprises MCrAlY, where M is at least one of nickel (Ni), iron (Fe), and cobalt (Co), and the second oxidation resistant powder comprises at least one of Al-11.6Si and Ni-60Al-1B.

28. A method according to claim 17, the method further comprising heat treating, wherein a portion of the bond coat melts and, upon re-solidification, joins the bond coat to the substrate.

29. A method according to claim 17, wherein the substrate comprises a turbine component.

30. A method according to claim 17, wherein the disposing of the overlayer forms the uneven, undulated, and irregular surface with roughness in a range from about $2.5 \times 10^{-4}$ cm Ra to about $5.0 \times 10^{-3}$ cm Ra.

31. A method according to claim 17, wherein the disposing of the overlayer forms the uneven, undulated, and irregular surface with roughness in a range from about $2.5 \times 10^{-4}$ cm Ra to about $1.0 \times 10^{-3}$ cm Ra.

32. A method according to claim 17, wherein the disposing of the overlayer forms the uneven, undulated, and irregular surface with roughness in a range from about $2.5 \times 10^{-4}$ cm Ra to about $7.5 \times 10^{-4}$ cm Ra.

* * * * *